(12) United States Patent
Miller

(10) Patent No.: US 9,233,589 B1
(45) Date of Patent: Jan. 12, 2016

(54) CAM BOLT APPARATUS FOR SUSPENSION SYSTEMS

(71) Applicant: Northstar Manufacturing Co., Inc., Minnetonka, MN (US)

(72) Inventor: Shawn Christopher Miller, Milaca, MN (US)

(73) Assignee: Northstar Manufacturing Co., Inc., Minnetonka, MN (US)

( * ) Notice: Subject to any disclaimer, the term of this patent is extended or adjusted under 35 U.S.C. 154(b) by 0 days.

(21) Appl. No.: 14/138,300

(22) Filed: Dec. 23, 2013

Related U.S. Application Data

(60) Provisional application No. 61/878,914, filed on Sep. 17, 2013.

(51) Int. Cl.
| | | |
|---|---|---|
| *B60G 7/02* | (2006.01) | |
| *B62D 17/00* | (2006.01) | |
| *F16B 19/02* | (2006.01) | |
| *F16B 35/04* | (2006.01) | |
| *F16B 43/00* | (2006.01) | |

(52) U.S. Cl.
CPC ........ *B60G 7/02* (2013.01); *B62D 17/00* (2013.01); *F16B 19/02* (2013.01); *F16B 35/041* (2013.01); *F16B 43/00* (2013.01); *B60G 2200/46* (2013.01); *B60G 2200/4622* (2013.01); *B60G 2204/42* (2013.01)

(58) Field of Classification Search
CPC .............. B60G 7/02; B60G 2200/46; B60G 2200/4622; B60G 2204/129; B60G 2204/42; B60G 15/07; B60G 2206/8207; B62D 17/00; F16B 19/02; F16B 35/041; F16B 2/18; F16B 5/0225; F16B 43/00
See application file for complete search history.

(56) References Cited

U.S. PATENT DOCUMENTS

| | | |
|---|---|---|
| 4,364,288 A | 12/1982 | Castoe |
| 4,420,170 A | 12/1983 | Wysocki |
| 4,577,534 A | 3/1986 | Rayne |
| 4,733,884 A | 3/1988 | Pettibone et al. |
| 4,736,964 A | 4/1988 | Specktor |
| 5,044,659 A | 9/1991 | Specktor et al. |
| 5,580,201 A | 12/1996 | Brilmyer |
| 6,302,416 B1 | 10/2001 | Schmack |
| 6,409,189 B1 | 6/2002 | Orimoto et al. |
| 6,446,991 B1 | 9/2002 | Klais |
| 6,503,039 B2 | 1/2003 | Ward |
| 6,684,516 B2 | 2/2004 | Voller et al. |
| 6,688,616 B1 | 2/2004 | Ziech |
| 6,851,687 B2 | 2/2005 | Klais |
| 7,111,855 B2 | 9/2006 | Winkler et al. |
| 7,370,868 B2 | 5/2008 | Genick, II |
| 7,661,916 B2 | 2/2010 | Downey |
| 7,891,679 B2 | 2/2011 | Svartz et al. |
| 8,297,902 B2 | 10/2012 | Schraer |
| 8,469,371 B1 | 6/2013 | Lee et al. |
| 8,544,861 B2 | 10/2013 | Frens |
| 8,622,406 B2 * | 1/2014 | Eveley ............... B60G 7/02 280/124.116 |

FOREIGN PATENT DOCUMENTS

| | | |
|---|---|---|
| EP | 1598260 A1 | 11/2005 |
| WO | 2005/076956 A2 | 8/2005 |

* cited by examiner

*Primary Examiner* — Paul N Dickson
*Assistant Examiner* — Joselynn Y Sliteris
(74) *Attorney, Agent, or Firm* — Haugen Law Firm PLLP

(57) ABSTRACT

An apparatus is described for increasing a range of adjustment of a suspension system. The apparatus includes a cam bolt having an internal cam feature and external cam feature that together allow for increased range of adjustment.

10 Claims, 13 Drawing Sheets

CAM BOLT APPARATUS FOR SUSPENSION SYSTEMS

CROSS-REFERENCE TO RELATED APPLICATIONS

This application claims the filing benefit and priority of U.S. Provisional Application Ser. No. 61/878,914 filed Sep. 17, 2013, the contents which are incorporated herein by reference in its entirety.

FEDERAL SPONSORSHIP

Not Applicable

JOINT RESEARCH AGREEMENT

Not Applicable

TECHNICAL FIELD

The present invention relates to a fastener apparatus generally, and more particularly to a cam bolt apparatus for providing alignment adjustment in an automotive suspension system.

BACKGROUND

Cam bolt apparatus are used in automotive vehicle suspensions to provide adjustment between respective components of the suspension system to control wheel alignment, such as camber, caster, and/or tow alignment. Cam bolt apparatus typically include a bolt, a first cam washer fixed to the bolt proximate to the bolt head, a second cam washer engaged to a shank of the bolt distal from the bolt head, and a nut that may be threaded onto a threaded portion of the bolt to secure the bolt to a cam bracket. The bolt and the cam washers are eccentrically arranged, such that rotation of the apparatus about a cam washer adjusts a position of a longitudinal axis of the bolt within accommodating slots formed in the cam bracket. With a control arm or other suspension component linked to the cam bolt, such positional adjustment correspondingly adjusts the automotive suspension component position, thereby affecting a suspension alignment characteristic, such as wheel camber.

The extent of suspension characteristic adjustment afforded by the above described conventional cam bolt apparatus is limited by the degree of eccentricity of the cam bolt to the cam washer axis. The degree of suspension adjustment has therefore been limited to the eccentric offset, which is typically between about 0.5-3° degrees of adjustment. In some circumstances, such an adjustment range has proven to be insufficient. There is accordingly a need to increase the extent of suspension alignment adjustment afforded by a cam bolt apparatus.

SUMMARY

Embodiments according to aspects of the invention include an apparatus for adjusting a position of members of a suspension system. In an embodiment of the invention, the apparatus includes a bolt having an eccentric inner cam portion and an eccentric outer cam portion. The bolt includes a shaft having a first threaded portion and a second enlarged head portion, where the shaft, threaded portion and enlarged head portion have a central longitudinal axis. The bolt also includes outer eccentric cams or first and second washers fixed to the bolt. The first washer is fixed to the bolt adjacent the first threaded portion and the second washer is fixed to the bolt adjacent the enlarged head portion. The washers are fixed to the bolt so that a center axis of both of the washers is offset from the central axis of the bolt. An inner eccentric cam or lobe extends outwardly from a portion of the shaft between the first and second eccentric washers. The lobe includes a longitudinal center axis offset from the central longitudinal axis of the bolt.

Further, the central axis of the bolt, the center axis of the first and second washers and the center axis of the lobe are planar. Alternatively, the central axis of the bolt, the center axis of the first and second washers and the center axis of the lobe are not planar. In an embodiment of the invention the first washer is removably fixed to the bolt with a keyed slot. A further embodiment of the invention includes a suspension adjustment bracket that has elongated slots to receive the bolt and includes flanges extending from the bracket to engage the first and second washers on opposing sides of the washer.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Figure 1:
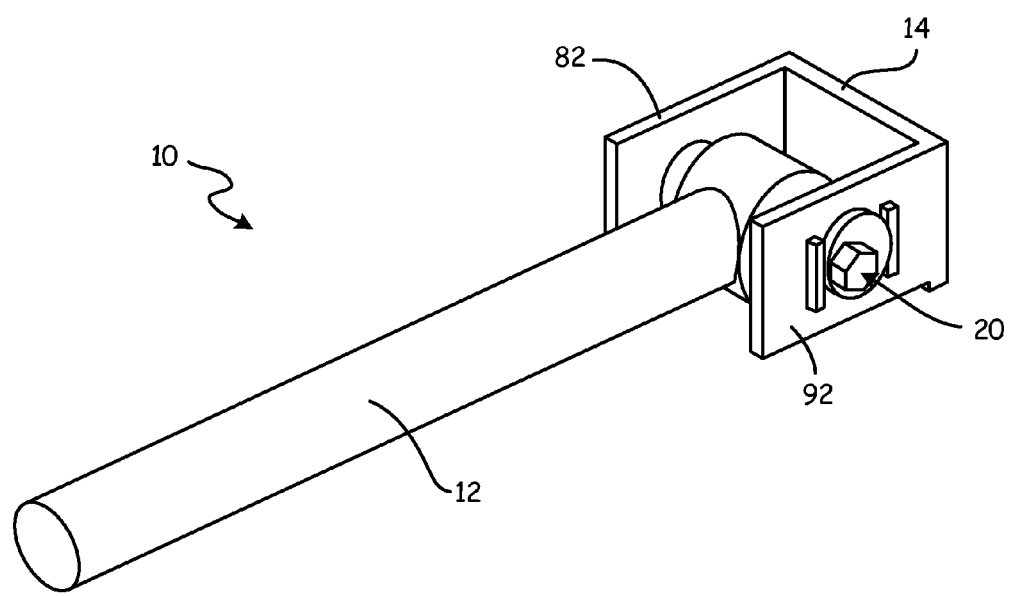
FIG. 1 is a front end perspective view of a portion of a suspension system in accordance with an embodiment of the invention.
Figure 2:
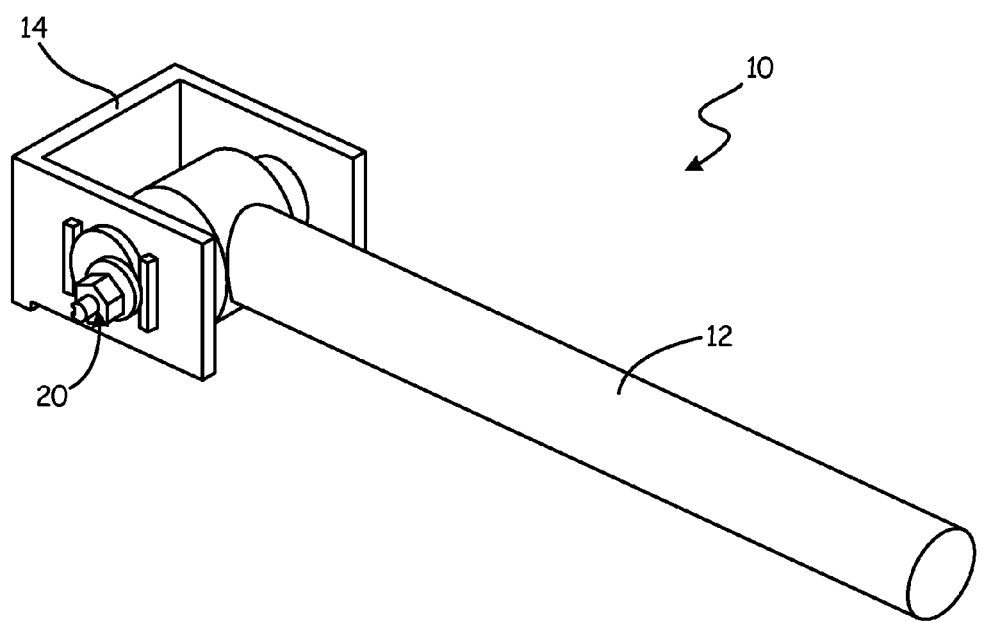
FIG. 2 is a front opposing end perspective view of a portion of a suspension system of the type shown in FIG. 1.
Figure 3:
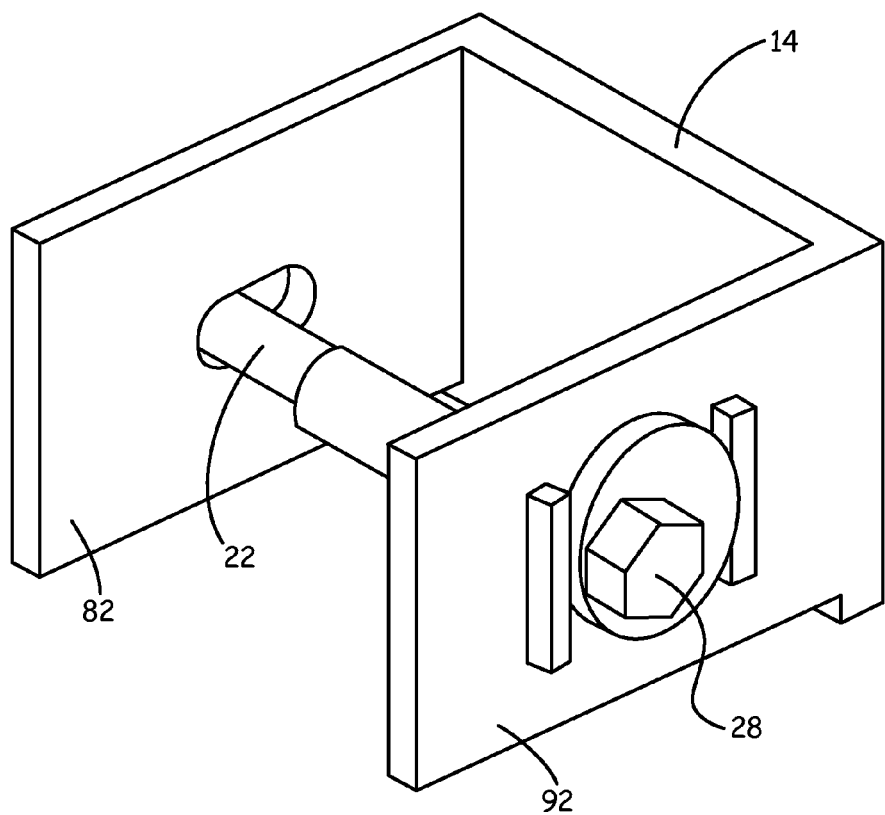
FIG. 3 is a front end perspective view of a portion of a bracket and cam bolt in accordance with an embodiment of the invent.
Figure 4:
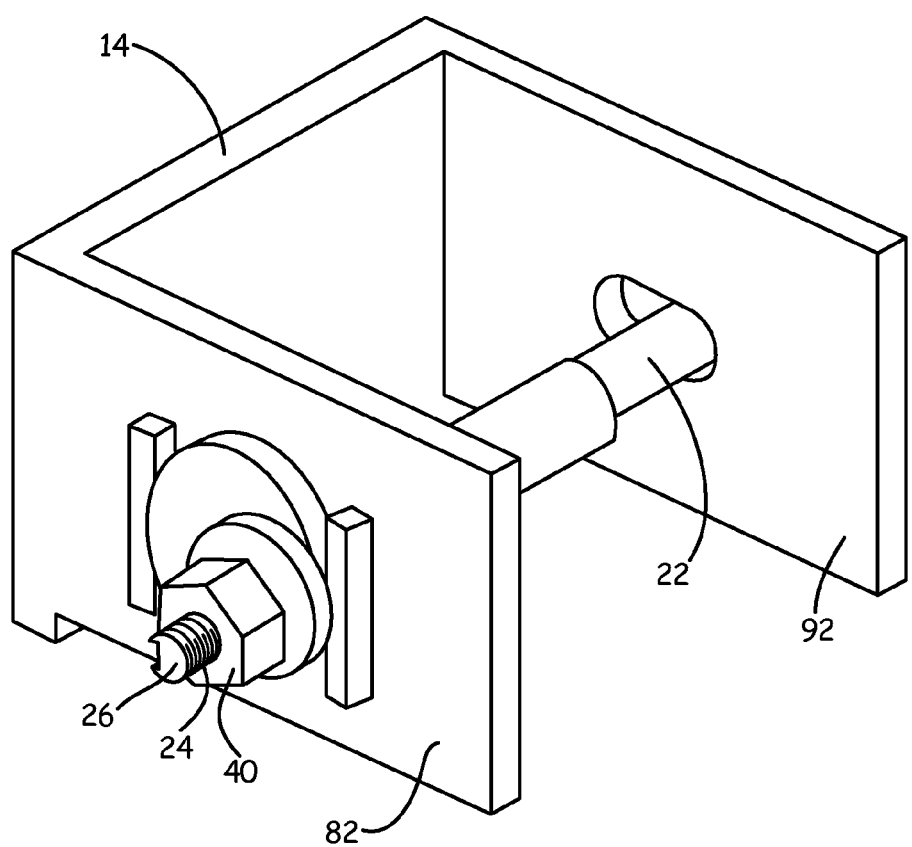
FIG. 4 is a front opposing end perspective view of the bracket and cam bolt of the type shown in FIG. 3.
Figure 5:
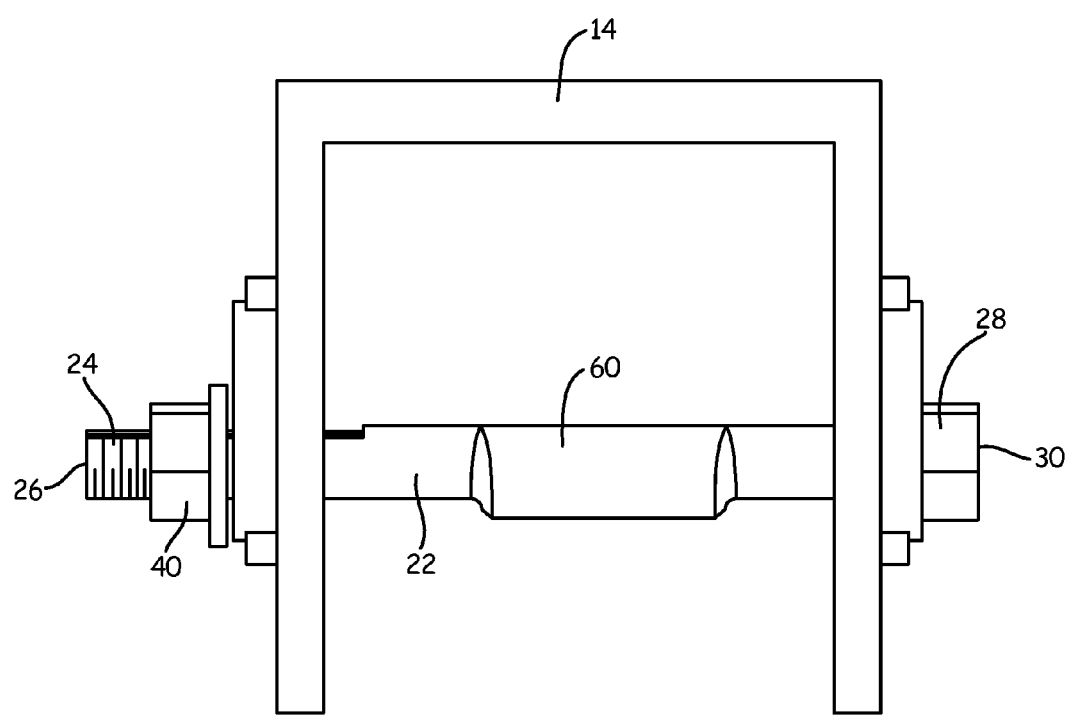
FIG. 5 is a top plan view of the bracket and cam bolt of the type shown in FIG. 3.
Figure 6:
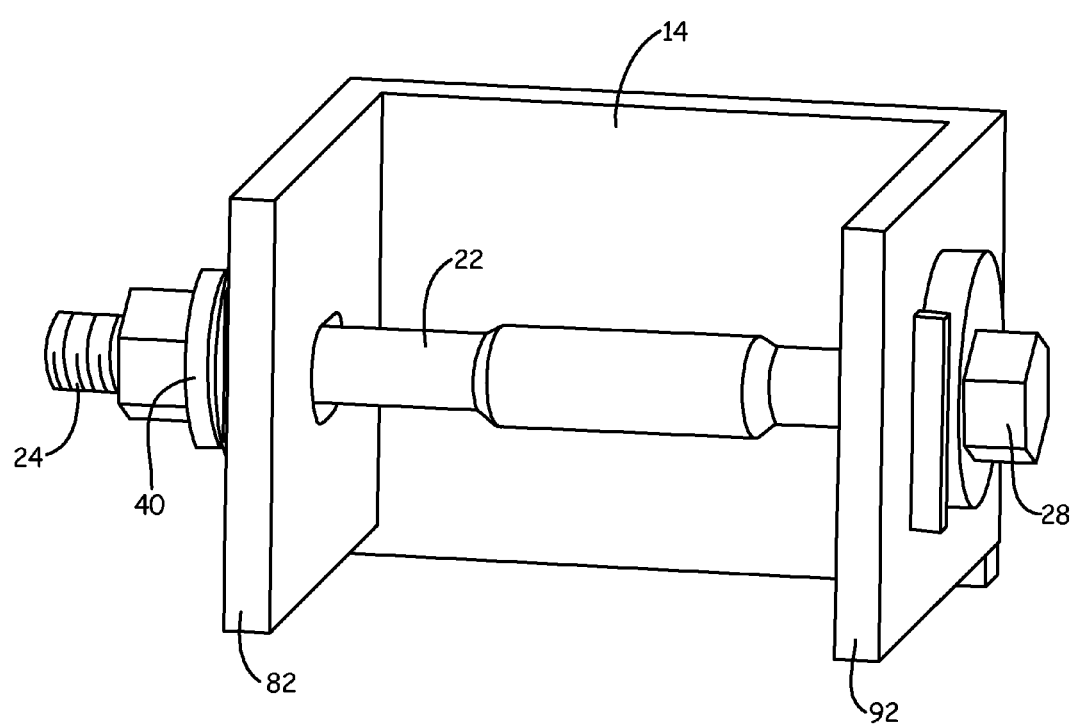
FIG. 6 is a front perspective view of the bracket and cam bolt of the type shown in FIG. 3.

The suspension system 10 of the present invention generally includes a suspension linkage 12, bracket or frame 14, and cam bolt 20. FIGS. 1 and 2 illustrates a suspension linkage 12 coupled to the bracket or frame 14 by the cam bolt apparatus 20. The suspension linkage 12 may be from, for example, a wheel assembly arm, such as an upper or lower control arm, and the bracket 14 may be secured to or formed as a portion of a vehicle frame. The suspension linkage 12 may be positioned between opposed sides 82 and 92 of bracket 14, such that a cam bolt 20 extends through an aperture of the linkage 12 and slots 84 and 94 of the bracket 14 to secure the linkage 12 to the bracket.

With reference to FIGS. 3-6, cam bolt apparatus 20 is shown secured to the bracket 14 without linkage 12. Cam bolt 20 includes a shank or shaft 22 having a first threaded portion 24 formed on a first end 26 of the shaft 22 and a second enlarged head portion 28 formed on a second end 30 of the shaft 22. The enlarged head portion 28 is shown configured as a hexagonal head formed at an end of the shaft 22, such that rotation of head 28 with a tool or other positioning device correspondingly rotates shaft 22. The threaded portion 24 of shaft 22 is configured to receive a securement nut 40 for securing cam bolt 20 to the bracket 14.

Figure 7:
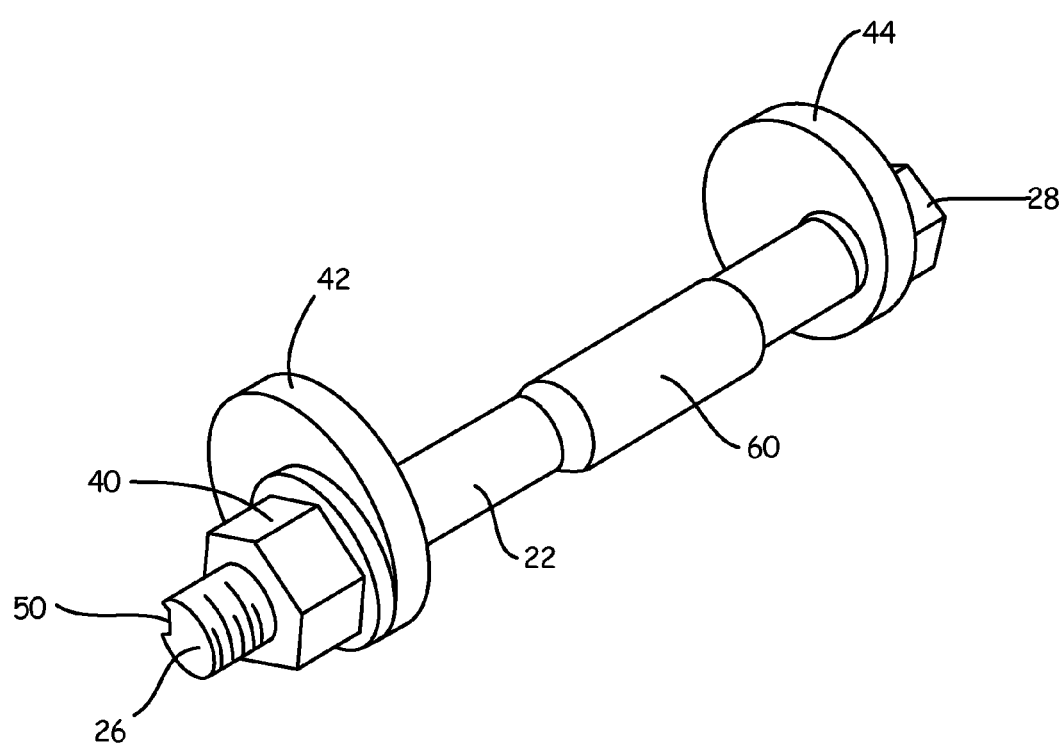
FIG. 7 is a front first end perspective view of a cam bolt in accordance with an embodiment of the invention.
Figure 8:
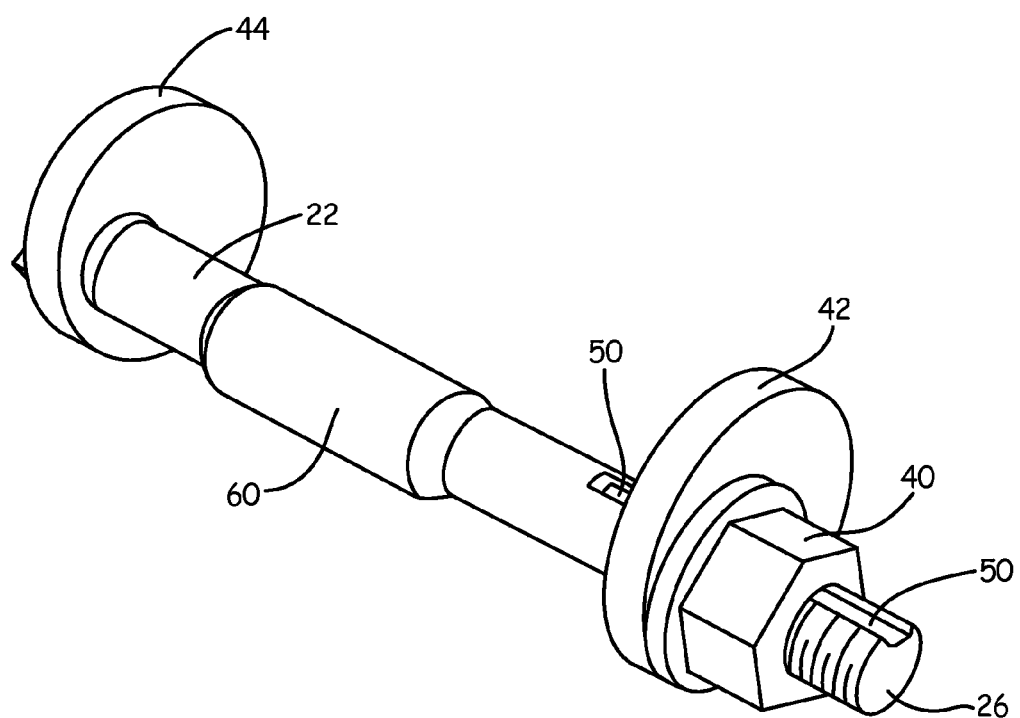
FIG. 8 is a back first end perspective view of the cam bolt of the type shown in FIG. 7.
Figure 9:
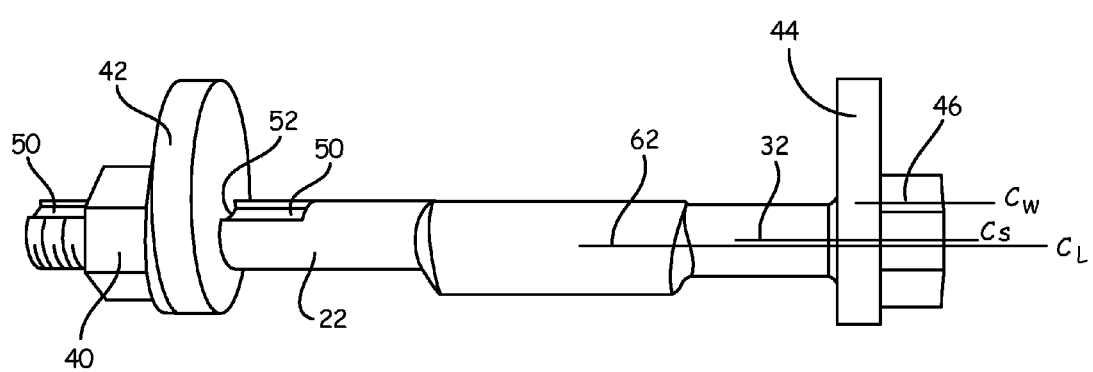
FIG. 9 is a back perspective view of the cam bolt of the type shown in FIG. 7.

With further reference to FIGS. 7-9, cam bolt 20 further includes first and second cam washers 42 and 44 fixed to the shaft 22. In some embodiments, first washer 42 may be secured to and fixed to the shaft 22 of cam bolt 20 via a keyed slot 50 and key 52 formed on an aperture of the washer 42. Second washer 44 may be press fit, engaged, welded, formed integral or otherwise fixedly secured to the shaft 22 proximate to and adjacent the hexagonal head 28. Accordingly, first and second washers 42 and 44 rotate simultaneous with and in conjunction with rotation of shaft 22. Keyed slot 50 may represent, for example, a flat region in an otherwise circular cross-section of the first end 26 of shaft 22. The keyed slot or flat 50 may be machined along the first threaded portion 24, wherein the slot 50 cooperates with a configuration formed in the aperture of the washer 42 which acts as the key 52. In this manner, the engagement between key 52 and the slot 50 formed in the shaft 22 restricts or prevents relative rotation between the washer 42 and shaft 22. Various key and key-hole arrangements are known in the art, and are contemplated as being useful in the present invention.

The center axis of apertures extending through each washer is offset from the respective centers of first and second washers 42 and 44 such that when the washers are engaged to the cam bolt 20, the center axis 46 of the washers is offset from and eccentric from the central longitudinal axis 32 of the shaft 22 (See FIG. 9). A lobe 60 extends from a mid-region of the shaft 22 and, although circular in cross section in some embodiments, the lobe 60 has a center axis 62 that is offset or eccentric to both the center axis 46 of the washers and the central longitudinal axis 32 of the shaft 22. Further, in embodiments of the invention the threaded end portion 24, head portion 28 and shaft 22 may all share a common central longitudinal axis 32. Depending upon the purpose and desired adjustment, the central longitudinal axis 32 of the shaft, the center axis 46 of the washers, and the center axis 62 of the lobe may be aligned planar or may be aligned so that all three axis do not lie in the same plane.

Figure 10:
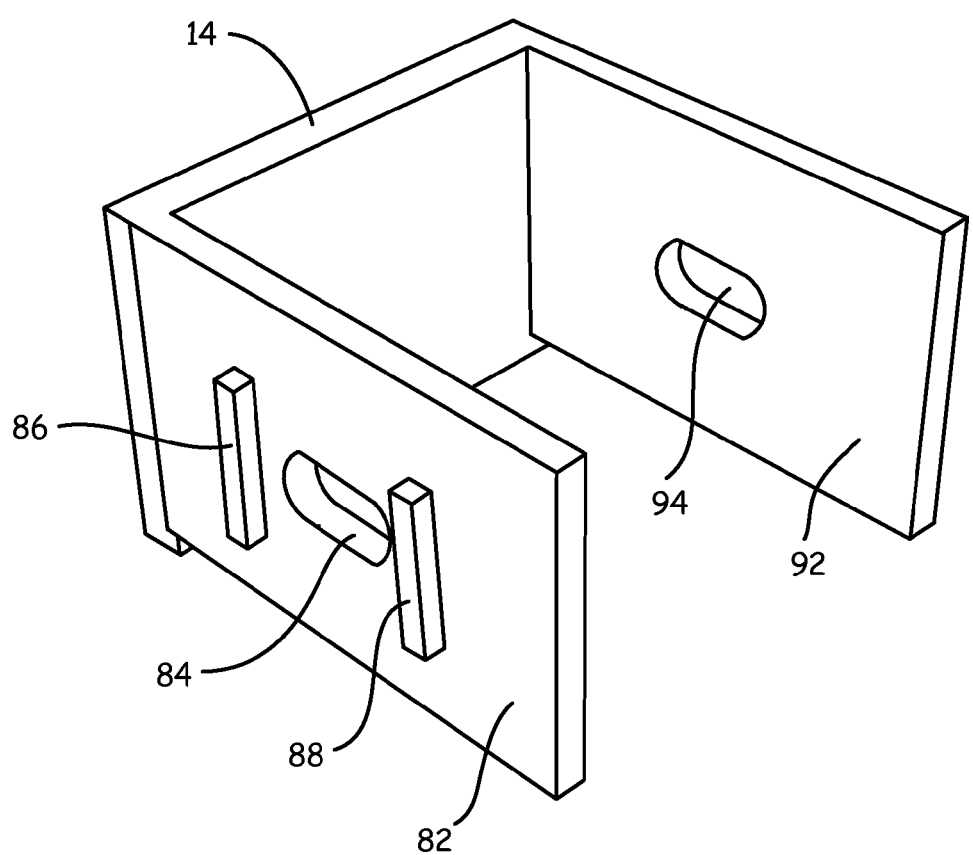
FIG. 10 is a perspective view of a portion of a bracket of a suspension system in accordance with an embodiment of the invention.
Figure 11:
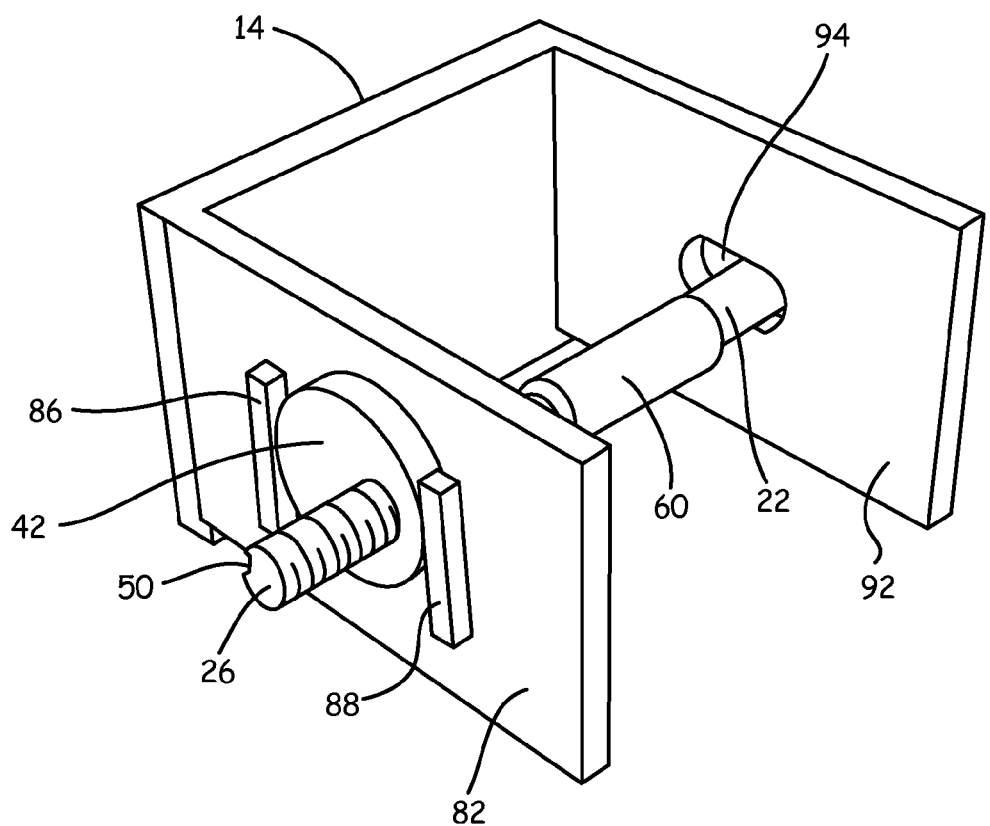
FIG. 11 is a perspective view of the bracket of the type shown in FIG. 10 having a cam bolt inserted and engaged with the bracket in accordance with an embodiment of the invention.
Figure 12:
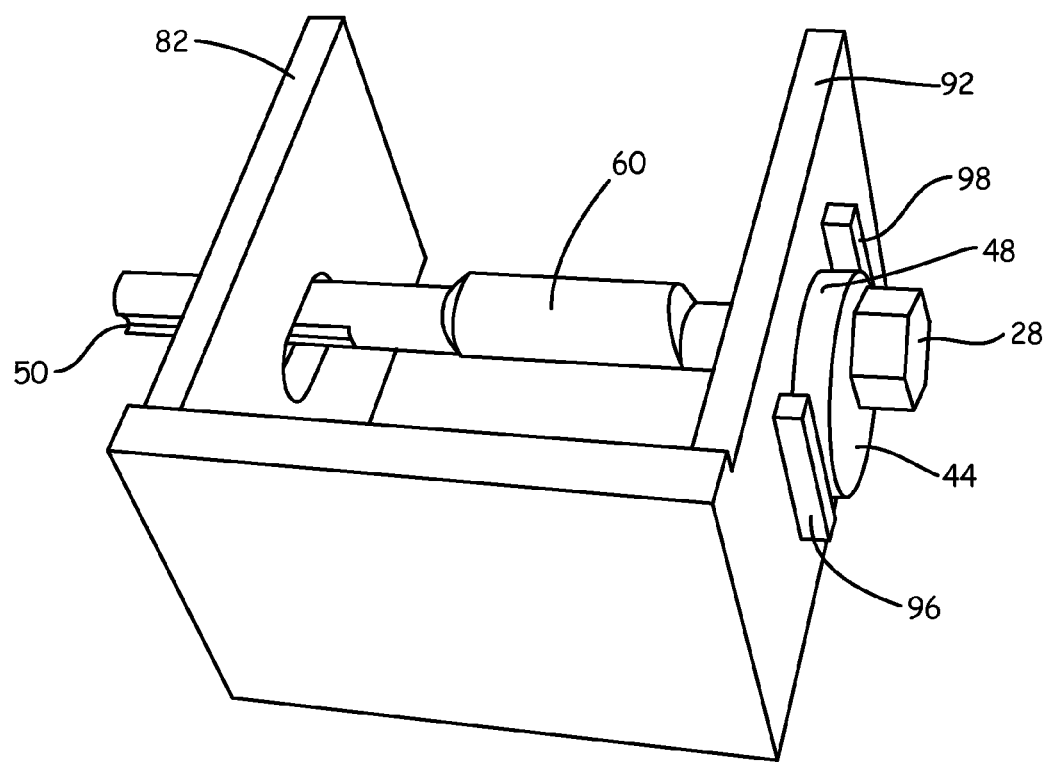
FIG. 12 is a bottom back end perspective view of the bracket and cam bolt of the type shown in FIG. 11.
Figure 13:
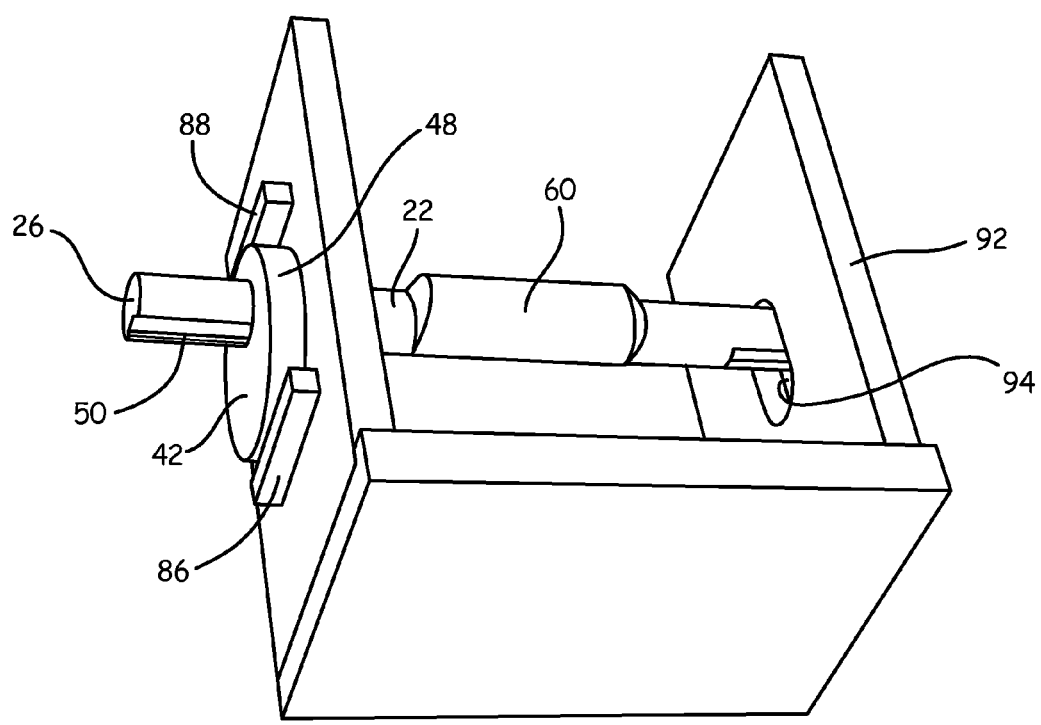
FIG. 13 is a bottom back opposing end perspective view of the bracket and cam bolt of the type shown in FIG. 12.

With reference to FIG. 10, the bracket 14 includes elongated slots 84 and 94 extending through respective sides 82 and 92 of the bracket. Ridges or flanges 86 and 88 corresponding with slot 84 and ridges or flanges 96 and 98 corresponding with slot 94 extend from respective sides 82 and 92 of bracket 14. The flange pairs are aligned on opposing ends of each elongated slot and are spaced apart a distance so that the outer diameters of washers 42 and 44 are slightly less than the distance between the flanges. In this manner, when the hex head 28 is turned the washers rotate but are contained between the flanges while the bolt slides in the elongated slot dependent upon the orientation or position of the center axis 46 of the washers relative to the central longitudinal axis of the shaft 22. The flanges, therefore, provide cam bearing surfaces engaging respective outer edges or races 48 of first and second cam washers 42 and 44 to brace first and second washers 42 and 44 against longitudinal movement. Slots 84 and 94 likewise brace against shaft 22 to restrict or limit movement of bolt 20 along the elongated slot.

In use, the user may insert the free or first end 26 of the shaft 22 through slot 94, the aperture of the linkage 12, and slot 84 until washer 44 engages between flanges 96 and 98. Washer 42 is then engaged on the shaft 22 aligning the key 52 in the keyed slot 50 and pressing the washer in position between flanges 86 and 88. Securement nut 40 is then rotated onto the shaft around the threaded portion 24 until an inner shoulder of the nut 40 engages the washer 42, thereby restricting the cam bolt 20 within the bracket 14. Rotation of cam bolt 20 results in corresponding rotary movement of first and second cam washers 42 and 44. Since first and second cam washers 42 and 44 are held against lateral movement by corresponding flanges, such rotation of first and second washers 42 and 44 results in movement of shaft 22 within first and second slots 84 and 94. This movement causes a shifting of the position of the suspension linkage 12 relative to the bracket 14. Depending upon the orientation of the center axis of the shaft, lobe and washers, the user may correspondingly adjusts a suspension characteristic, such as wheel camber. The extent of such adjustment is limited by the movement of shaft 22 within slots 84 and 94 and the orientation of the lobe on the shaft 22. It has been found that, in some cases, the extent of adjustment available in conventional systems is insufficient.

In order to enhance the extent of adjustment available in the cam bolt apparatus 20, the eccentricity of lobe 60 accentuates the movement of the linkage 12 as cam bolt 20 moves within first and second slots 84 and 94 from rotation of cam bolt 20, as described above. Lobe 60 may be configured with a circular or non-circular cross-section, and preferably includes an apex portion that is a maximal radial distance from the non-lobed portions of shaft 22. In some embodiments, the apex of the lobe 60 may be arranged radially outwardly from shaft 22 in a manner that coincides with the eccentricity of shaft 22 with respect to first and second cam washers 42 and 44. In other words, lobe 60 may form an apex portion 60 within a plane containing shaft axis 32 and cam washer center axis 46, so as to most accentuate movement of the linkage 12 along a path of the slot, through the rotational adjustment of cam bolt apparatus 20, as described above. Cam bolt 20 may include lobe 60 at only a single side thereof, such that the resultant structure is asymmetrical with respect to shaft axis 32. In one embodiment, the diameter of shaft 22 may be about 0.36 inches while the diameter of the lobe 60 may be about 0.48 inches.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended dams, the transitional terms comprising and including are used in the open ended sense in that elements in addition to those enumerated may also be present. Other examples will be apparent to those of skill in the art upon reviewing this document.

What is claimed is:

1. An apparatus for adjusting a position of a suspension member coupled by a bolt, said apparatus comprising:
    a bolt having a shaft including a first threaded portion and a second enlarged head portion, said shaft, threaded portion and enlarged head portion having a common central longitudinal axis;
    first and second washers fixed to the bolt, said first washer fixed adjacent said first threaded portion and said second washer fixed adjacent said enlarged head portion, wherein a center axis of both of said washers is offset from said central axis of said shaft; and
    a lobe extending outwardly from a lengthwise mid region portion of an outer portion of the shaft between said first and second washers and extending from the shaft without contacting either of said first and second washers, said lobe including a longitudinal center axis offset from the central longitudinal axis of said shaft.

2. The apparatus as recited in claim 1, wherein said central axis of said shaft, said center axis of said first and second washers and said center axis of said lobe are planar.

3. The apparatus as recited in claim 1, wherein said central axis of said shaft, said center axis of said first and second washers and said center axis of said lobe are not planar.

4. The apparatus as recited in claim 1, wherein said first washer is removably fixed to said bolt with a keyed slot.

5. The apparatus as recited in claim 1, further including a suspension adjustment bracket that includes elongated slots to receive said bolt and including flanges extending from said bracket on opposing ends of each slot to engage said first and second washers on opposing sides of each washer.

6. An apparatus for adjusting a position of a suspension member coupled by a bolt, said apparatus comprising:
    a bolt having a shaft including a first threaded portion and a second enlarged head portion, said shaft, threaded portion and enlarged head portion having a common central longitudinal axis;
    first and second washers fixed to the bolt, said first washer fixed adjacent said first threaded portion and said second washer fixed adjacent said enlarged head portion, wherein a center axis of both of said washers is offset from said central axis of said shaft;
    a lobe extending outwardly from a lengthwise mid region portion of the shaft and longitudinally spaced apart from said first and second eccentric washers, said lobe including a longitudinal center axis offset from the central longitudinal axis of said shaft;
    wherein said central axis of said shaft, said center axis of said first and second washers and said center axis of said lobe are not planar.

7. The apparatus as recited in claim 6, wherein said first washer is removably fixed to said bolt with a keyed slot.

8. The apparatus as recited in claim 6, further including a suspension adjustment bracket that includes elongated slots to receive said bolt and including flanges extending from said bracket to engage said first and second washers on opposing sides of each washer.

9. An apparatus for adjusting a position of a suspension member coupled by a bolt, said apparatus comprising:
    a bolt having a shaft including a first threaded portion and a second enlarged head portion, said shaft, threaded portion and enlarged head portion having a common central longitudinal axis;
    first and second washers fixed to the bolt, said first washer fixed adjacent said first threaded portion and said second washer fixed adjacent said enlarged head portion, wherein a center axis of both of said washers is offset from said central axis of said shaft;
    a lobe extending outwardly from a mid portion of the shaft, said lobe being longitudinally spaced apart from said first and second washers, said lobe extending without contacting said first and second washers, said lobe including a longitudinal center axis offset from the central longitudinal axis of said shaft; and
    said first washer being removably fixed to said bolt with a keyed slot.

10. The apparatus as recited in claim 9, further including a suspension adjustment bracket that includes elongated slots to receive said bolt and including flanges extending from said bracket on opposing ends of each slot to engage said first and second washers on opposing sides of each washer.

* * * * *